Feb. 25, 1936.    J. H. DAVIS    2,032,264
METHOD OF PRESERVING GRAIN IN STORAGE
Filed Jan. 12, 1933    7 Sheets-Sheet 1

Inventor
Jesse H. Davis.

Fig. 2.

Inventor
Jesse H. Davis.

Feb. 25, 1936.    J. H. DAVIS    2,032,264
METHOD OF PRESERVING GRAIN IN STORAGE
Filed Jan. 12, 1933    7 Sheets-Sheet 5

Inventor
Jesse H. Davis.
By
Attorney

Feb. 25, 1936.  J. H. DAVIS  2,032,264
METHOD OF PRESERVING GRAIN IN STORAGE
Filed Jan. 12, 1933  7 Sheets-Sheet 6

Inventor
Jesse H. Davis.

By
Attorney

Feb. 25, 1936.  J. H. DAVIS  2,032,264
METHOD OF PRESERVING GRAIN IN STORAGE
Filed Jan. 12, 1933  7 Sheets-Sheet 7

Inventor
Jesse H. Davis.
Attorney

Patented Feb. 25, 1936

2,032,264

UNITED STATES PATENT OFFICE 2,032,264

METHOD OF PRESERVING GRAIN IN STORAGE

Jesse H. Davis, Baltimore, Md.

Application January 12, 1933, Serial No. 651,434

10 Claims. (Cl. 99—153)

This invention relates to a method of and means for preserving grain in storage, such as grain stored in bins in elevators and other storage houses, and has particular reference to the treatment of grain by aeration so as to maintain it in a properly cool and suitably dry state to protect it from deterioration or injury due to the presence of undue heat or moisture, or from the ravages of insects, as well as to obviate the necessity of the "running" or handling of the grain for these purposes and thereby prevent or materially reduce losses due to insect depredations and those bulk or weight losses in the grain due to its physical travel and turning over movements in such method of treatment. The invention further has particular reference to the treatment of stored wheat and other grain in such manner as to greatly reduce the cost of maintaining the same in good condition.

"It is generally agreed by physiologists that energy for many physiological processes and reactions is released in living cells in an exothermic reaction or successions of reactions known collectively as respiration." This is a quotation from the September, 1921, issue Technical Bulletin No. 3 issued by University of Minnesota Agricultural Experimental Station.

The storage of grain and similar products subject to "respiration", resulting in heating of the stored product, if not relieved by airing or cooling, may attain to destructive temperatures. Therefore, it is the universal practice in the storage of grain and other similar materials to remove it from the bins for airing and cooling when it becomes necessary to do so on account of heating. Insect propagation is accelerated by temperature elevation under conditions of heating of stored products. By airing and cooling the product, i. e., running the stored product over a conveyer system so as to expose all particles of the product to contact with the surrounding air, depredations of the insect with which the material may be infested may be arrested.

The handling of stored grain and other materials in this manner, however, results in dockage losses, averaging approximately half of one percent for each turning or handling, and in addition considerable expense is involved in labor and for the operation of the machinery, etc. Moreover, the beneficial results of the turning of the grain is only of a temporary character, especially with respect to the activities of insects; due to the presence of which, as well as that of respiration, subsequent turnings are generally required.

It is very well known that heating of the grain very ordinarily occurs in the form of "hot spots", or localized heating, which may occur at any point, zone or level of the stored grain in the bin, which spots may spread with great rapidity if the heating action is not arrested. Prior to my invention no way had been found of dissipating these hot spots without removal of the grain from the bins and the turning of the grain in the customary manner, and no method devised of effectively treating stored grain at any location for the removal of heat or excess moisture liable to cause molding of the grain, or to arrest insect activities, without extensive turning or handling operations of the kind referred to.

One object of my invention is to provide a method of and means for treating grain in the bin whereby hot spots and excess moisture, stale air and foul gases may be easily and conveniently removed, and insect depredations arrested, without the necessity of removing the grain from the bins.

Another object of the invention is to provide a method and an apparatus whereby hot spots or other deleterious conditions at any point, zone or elevation in the stored grain in a bin may be treated, without the necessity of disturbing or removing the entire body of grain.

Still another object of the invention is to provide a method of and means for cooling the stored grain by the injection of air at a desired low temperature and withdrawing by suction warm and foul air and gases, whereby the grain may be kept in a cool condition and the depredations of insects and injuries due to other causes arrested and prevented.

Still another object of the invention is to provide a method of and means for aerating the grain for the removal of heat and excess moisture and foul air and gases, and to prevent insect depredations, whereby the entire body of air throughout a body of stored grain may be removed and replaced with fresh air during a certain time period, so that a mode of treatment for the preservation of the grain similar to that provided by nature may be employed.

Still another object of the invention is to provide a method and apparatus which avoids the expense of employing extra storage bins, as is necessary under the common practice of withdrawing the grain from the storage bins for cooling and airing, thus reducing the expense for equipment, as well as reducing the cost of handling and treatment and preventing the weight or bulk losses in the grain due to attrition and other causes in running the grain for airing and cooling.

Still another object of the invention is to provide a simple and economical method and type of apparatus whereby natural or artificially conditioned air may be employed for grain cooling and drying purposes as required, and whereby chemical cooling or fumigating agents may also be introduced whenever desired for the purpose of cooling and mitigating insect depredations in the stored grain or disinfecting the bins prior to storing.

With these and other objects in view, the invention consists of the method and steps of the method and the novel means hereinafter more fully described and claimed, reference being had to the accompanying drawings, showing certain means for carrying the invention into practical effect, in which:—

Fig. 3 is a view of the power plant and associated parts of the lower set of operating devices.

Referring now more particularly to the drawings, A represents a portion of a battery of cylindrical bins arranged in transversely alined pairs in accordance with a common practice in a grain elevator, the bins B and B' of each pair being shown in the present instance, for purpose of exemplification, as respectively provided with a two-pipe and a multiple-pipe system of aeration pipes, although it is to be understood that all bins of a battery or all bins of an elevator may be equipped exclusively with either system or that both systems may be used in any arrangement desired, as may be deemed advisable or most suitable in any particular installation. I will first describe the invention in connection with the two-pipe system employed in bins B, followed by a description of the invention in connection with the multi-pipe system employed in bins B'.

Disposed concentrically and axially within each bin B are two pipes 1 and 2, the outer pipe 1 comprising a stand pipe forming a housing for the inner pipe 2, which forms a fluid conductor and rotary valve member. The pipe 1 is composed of any suitable number of pipe sections which are spaced apart at their adjacent ends and are connected with each other and to the walls of the bin B by radial combined distributor and suction heads 3 arranged at different elevations or different horizontal zone levels substantially throughout the full length or depth of the bin. Each of these distributor and suction heads consists of a casing 4 formed of top and bottom members or sections 5 and 6 in threaded connection with the ends of the adjacent pipe sections and an interposed cast valve body or diaphragm 7, united to the said casing sections 5 and 6 by tap bolts 8 passing through flanges 9 on the casing sections and entering threaded sockets in the valve body. The valve body separates the casing sections, and consequently the pipe sections connected thereby, from communication with each other, but is provided with a central bore or passage 10 through which the valve pipe 2 extends.

Figure 1:
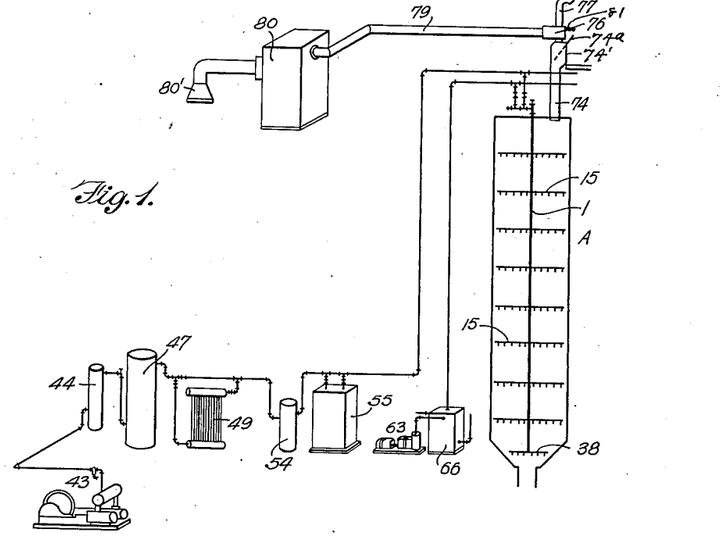
Fig. 1 is a diagrammatic view of an exemplificative type of apparatus which may be employed for carrying my invention into practical effect.
Figure 2:
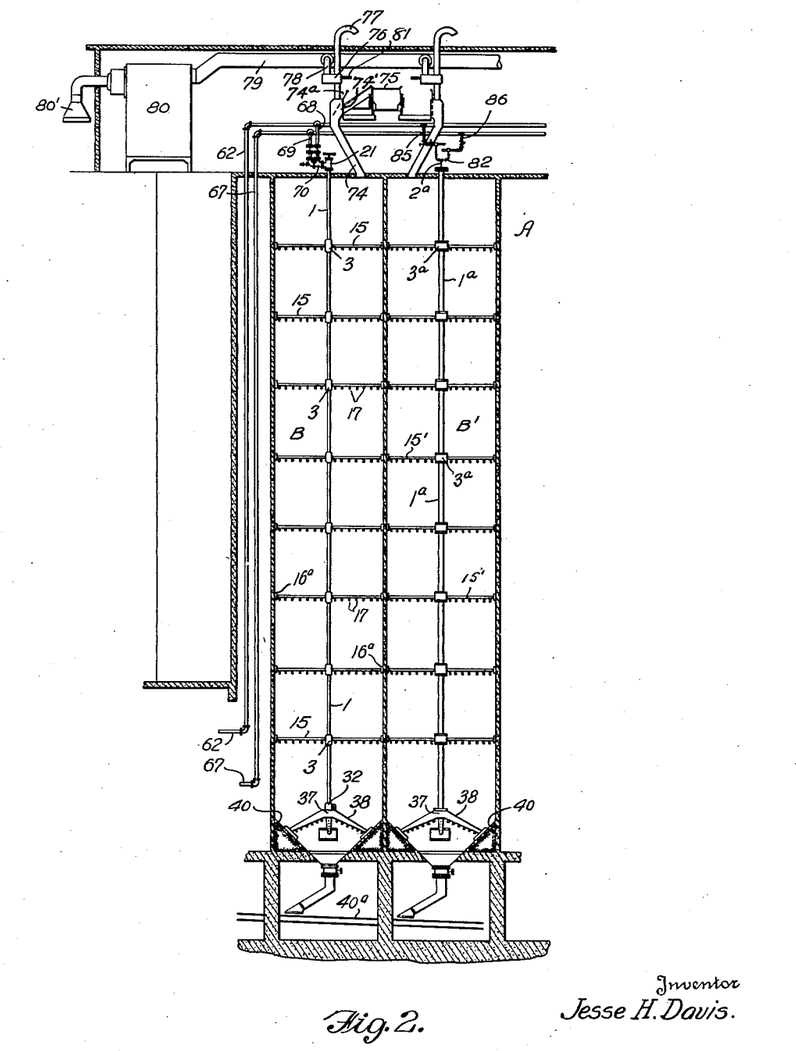
Fig. 2 is a vertical section through a pair of storage bins equipped with aeration devices embodying the invention, showing the air conditioner and overhead air supply and exhaust connections of the upper set of operating devices but omitting the power plant and associated parts of the lower set of operating devices, this view also showing a two-pipe aeration system applied to one of the bins and a multipipe aeration system applied to the other bin.
Figure 4:
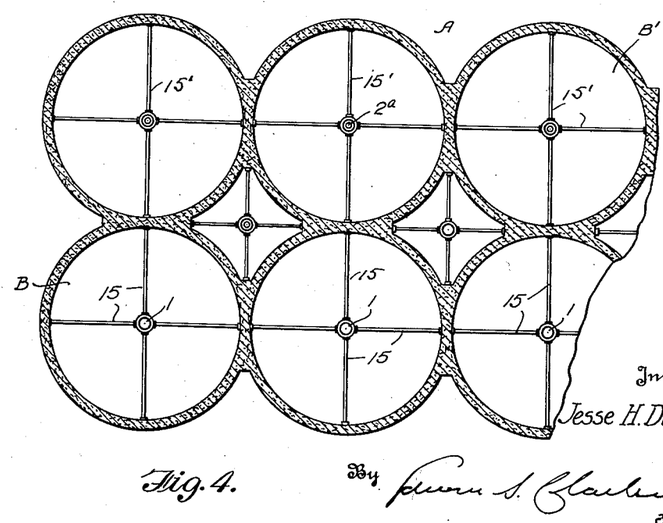
Fig. 4 is a sectional plan view of a number of circular bins of a battery of bins arranged in accordance with an established practice to which the invention is applied.
Figure 5:
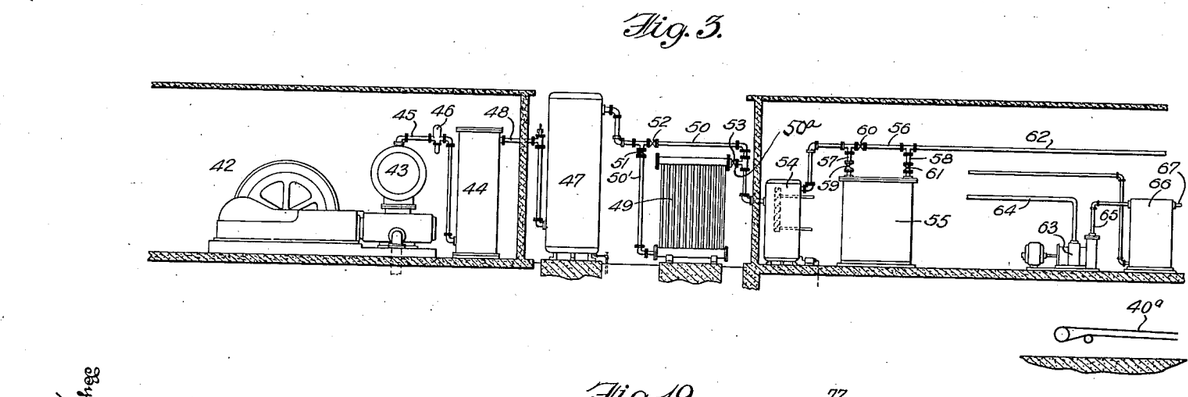
Fig. 5 is a vertical section on an enlarged scale through the upper end of the stand pipe and rotary distributor valve of the two-pipe system.
Figure 6:
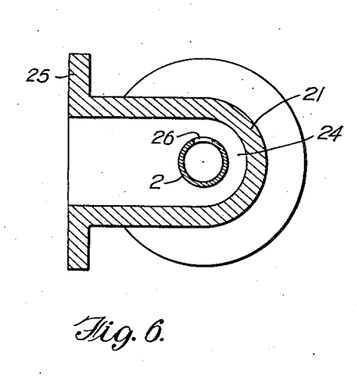
Fig. 6 is a section on the line 6—6 of Fig. 5.
Figure 7:
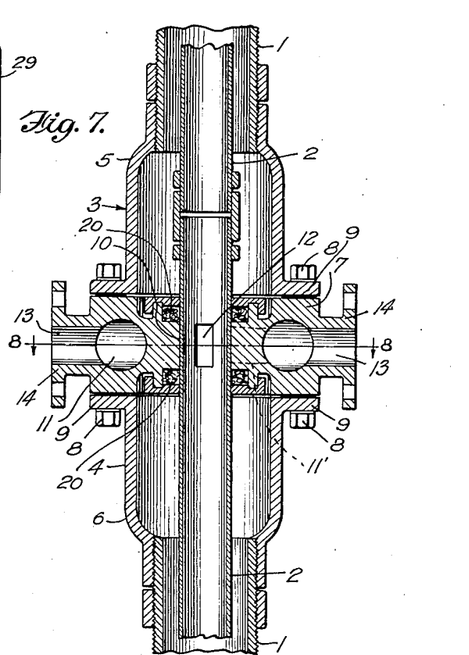
Fig. 7 is a vertical sectional view through one of the distributor heads or casings of the two-pipe system.
Figure 8:
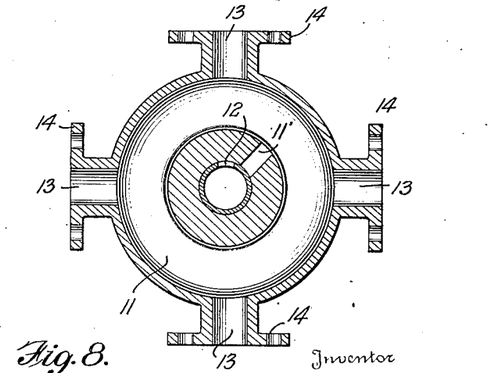
Fig. 8 is a section on line 8—8 of Fig. 7.
Figures 9, 10, 11:
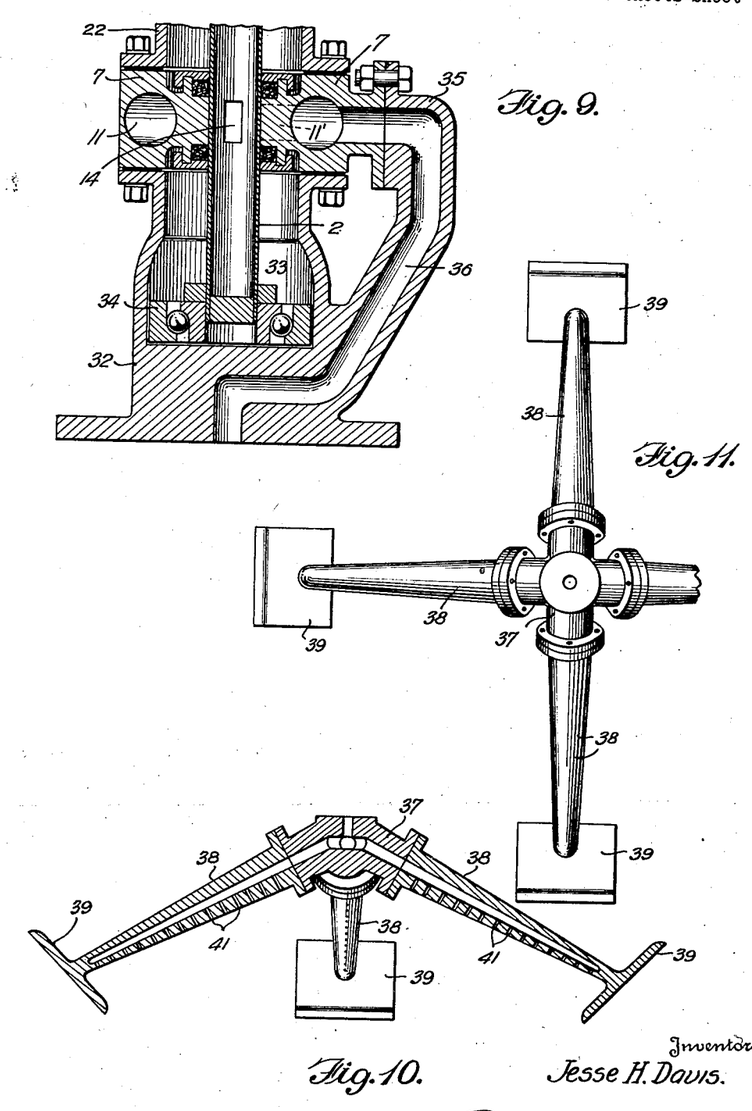
Fig. 9 is a similar view through the valve bearing and conductor casting and distributor casing at the lower end of the stand pipe.
Fig. 10 is a vertical sectional view through the bottom support.
Fig. 11 is a plan view of the bottom support.
Figure 12:
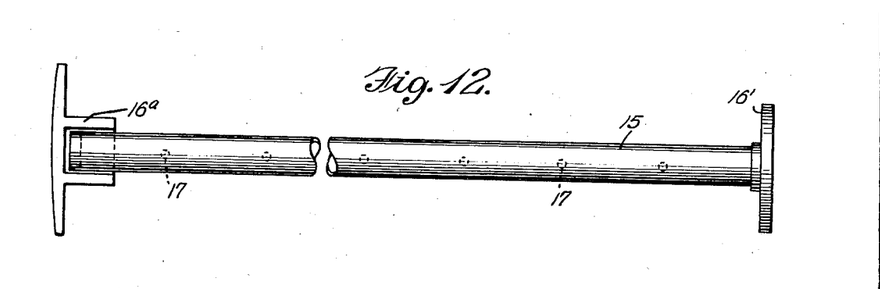
Fig. 12 is a plan view of one of the radial nozzle pipes and its supports.
Figure 13:
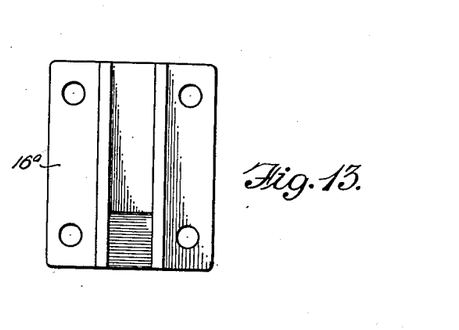
Figs. 13 and 14 are, respectively, an elevational view and a top plan view of one of said supports.
Figure 14:
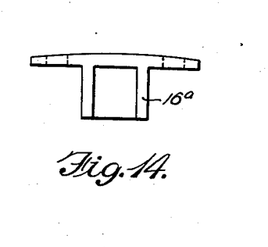
Figures 15, 16, 18:
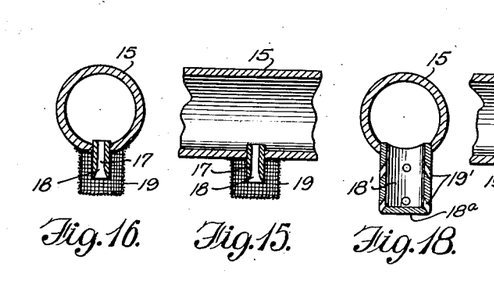
Figs. 15 and 16 are, respectively, a vertical longitudinal section and a vertical transverse section through a portion of a radial nozzle pipe on a line intersecting one of its nozzles, showing one form of nozzle and guard screen which may be employed.
Figs. 17 and 18 are views similar to Figs. 14 and 15 showing a different form of nozzle.
Figure 17:
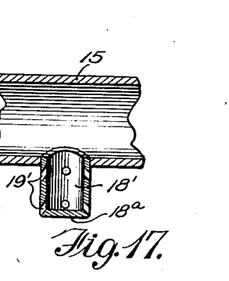
Figure 19:
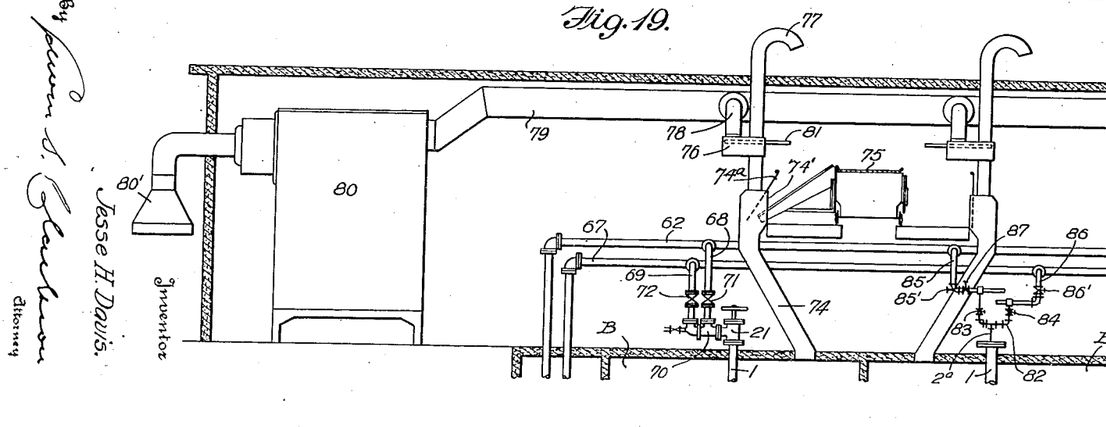
Fig. 19 is a view on an enlarged scale of the air conditioner and parts of the upper set of operating devices.
Figures 20, 22:
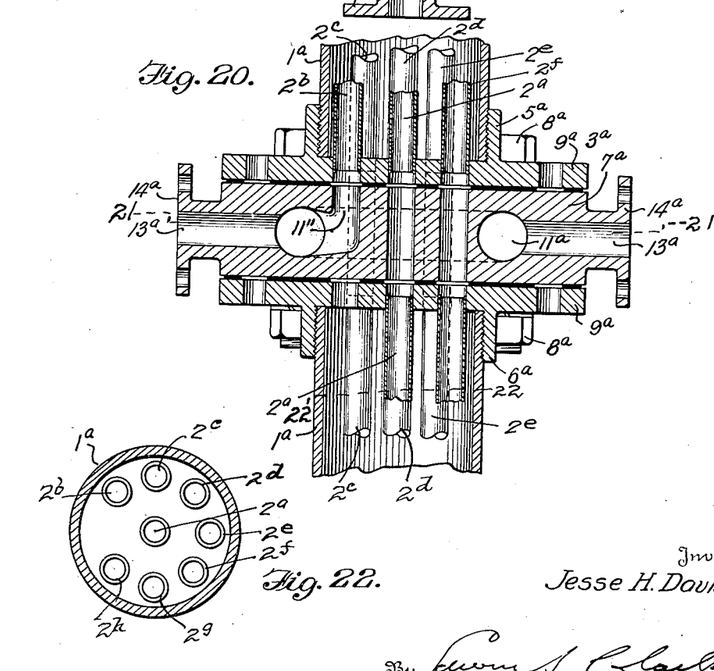
Fig. 20 is a view similar to Fig. 7 of one of the distributor heads or casings of the multi-pipe system.
Figs. 21 and 22 are sections on the lines 21—21 and 22—22 of Fig. 20.
Figure 21:
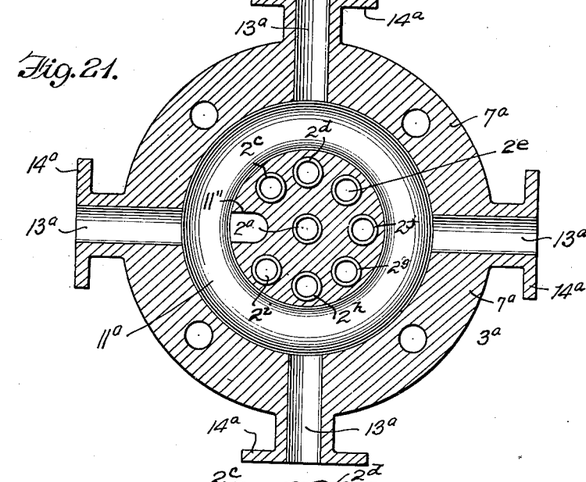

In the valve body is formed an annular conductor channel 11 with which is connected the bore 10 by a radial passage 11', which cooperates with a port 12 in the valve pipe 2, and from said channel extend outwardly radial passages 13 opening at the sides of the valve body through flanged nipples 14. To the flanged nipples 14 are connected the inner flanged ends 16' of radial conductor pipes 15 having their outer ends supported in brackets 16a fastened to opposite sides of the walls of the bin B. Each pipe is provided at its underside with a longitudinal series of nozzles 17 connecting the annular channel of the valve body with the interior of the bin through the pipes 15 and their nozzles 17. The pipes 15 thus lie at different levels within the grain stored in the bin and afford a means whereby when the port 12 in the valve pipe 2 is in register with the passage 11, air or other fluid under desired pressure may be forced into the bin and through the grain at each level and whereby air or gases may be withdrawn by suction from the interstices between the grain and discharged into the outer atmosphere. The nozzles 17, as shown in Figs. 15 and 16, may consist of small cylindrical tubes 18 enclosed by guard screens 19 to prevent clogging of the nozzle tubes by the grain or chaff or foreign materials in the grain, or in lieu thereof, as shown in Figs. 17 and 18, nozzle tubes 18' having closed outer ends 18a and provided with inclined ducts 19' in their sides may be employed, such ducts serving as fluid conductors and by their inclined arrangement having a screen effect to prevent clogging thereof by grain, etc. The valve body 7 is provided with stuffing boxes 20 to prevent leakage through bore 10 and passage 11.

The upper and lower sections of the pipe 1 are connected to casings 21 and 22 through which the adjacent ends of the valve pipe 2 extend. The casing 21 consists of a body having upper and lower packing chambers 23 and an intermediate chamber 24 with a flanged T-connection 25. The pipe 2 is provided with a port 26 similar to ports 12 in constant communication with the chamber 24 of the casing 21 and the upper projecting end of the pipe 2 is provided with a hand wheel 27 whereby it may be turned or rotated in pipe 1. The upper flanged end of the casing 21 is closed by a cover 28 which supports an indicator or pointer 29, while the lower flanged end of the casing 21 is connected to a flanged coupling 30 threaded to the upper section of pipe 1, and adjustable packing rings 31 are provided in the chambers 23 to compress the packing material therein. The casing 22 may be similar in construction to one of the casings 4 except as to the omission of the bottom section 6 and the bolting of the valve body thereof directly to the upper flanged end of a conducting and bearing casting 32 having a bearing chamber 33 in which is a ball-bearing 34 supporting the lower end of the valve pipe 2, and also having a flanged arm or connection 35 coupled to the T-connection of casing 22. The arm 35 is provided with a passage 36 which extends through the flanged bottom of the casting 32, which is fastened to the central body portion of an armed distributing and suction head 37 having hollow radial arms 38 provided with flanged outer ends 39 attached to the walls of the conical outlet 40 of the bin, which discharges onto the conveyor 40a. These arms 38, like the pipes 15, are provided with rows of bottom jet orifices or discharge nozzles 41 for fluid discharge or suction actions when the associated port 14 of the valve pipe 2 is in register with the T-connection of casing 22, the element 37 thus serving both as a base support for the stand and valve pipes and as a bottom distributor and suction nozzle. The valve port 26 in the upper end of the valve pipe 2 is in constant communication with the T-shaped inlet 25 of the casing 21, while the other ports 12 in said valve pipe associated with the casings 4 and 22 are all closed against communication with said casings in the normal position of the valve pipe and are so circumferentially spaced about the valve pipe, e. g., 40 circumferential degrees apart, that any certain distributor and suction head may be connected with the valve pipe to the exclusion of the others. In order to enable the pipe 2 to be rotated by means of the hand wheel 27 with certainty to the proper positions, the wheel 27 is provided with suitable gage marks or graduations for coaction with the pointer 29.

Mechanism is provided whereby compressed air, cooled or both cooled and otherwise conditioned, may be selectively supplied to the distributor and suction heads and expanded into the storage bin, or whereby air and/or other gases may be drawn by suction from the bin, and also whereby insecticide vapors or gases may be supplied for chemical treatment of the grain as occasion may require. The compressed air supply part of this mechanism comprises an air compressor 42, an intercooler 43 of the type commonly used with a 2-stage air compressor, a water cooled after cooler 44 in communication with the intercooler through a pipe 45 containing an oil separator 46, a receiver 47 for the compressed air from the pump in communication through a relief-valved pipe 48 with the aftercooler, an atmospheric aftercooler 49 having a by-pass connection with a supply pipe 50 leading from the receiver 47 by means of inlet and discharge connections 50' and 50a and a system of valves 51, 52 and 53, an oil and water separator 54 of approved type connected to the pipe 50 for relieving the air of any oil or water entrained therewith and in which may be placed suitable filter material for the purpose of eliminating or absorbing oil vapors or fumes which might otherwise be carried through the compressed air lines and delivered into the grain whereby tainting of the grain with oil or oil odors will be prevented, an air cooler and drier 55 having a by-pass connection with an air supply pipe 56 leading from the separator 54 through inlet and discharge connections 57 and 58 and a system of valves 59, 60 and 61, said cooler and drier 55 including a refrigerating coil arranged in an anhydrous-ammonia or other refrigerating system, and an air delivery pipe 62 leading therefrom. The suction or exhaust part of this mechanism comprises a vacuum pump 63 having a discharge pipe 64, and connected by a pipe 65 with the air delivery outlet of a dust-collector 66 whereby all dust, chaff and other solid particles entrained with the withdrawn air are removed from the air, the inlet of said dust collector being connected with a suction pipe 67. Pipes 68 and 69 couple the pipes 62 and 67 with a connection 70 attached to the T-connection of the casing 21 and in said pipes are controlling and cut-off valves 71 and 72. The connection 70 has a valved inlet 73 whereby a chemical fumigant or insecticide may be introduced for injection with the compressed air into the bin for treatment of the stored grain thereby, when such treatment of the grain is deemed desirable, or for sterilizing the bin preparatory to storage of the grain therein. Communicating with the top of each bin is a feed chute or spout 74 through which the grain is introduced from a belt unloader 75 or other transfer or transport means. The head of this chute or spout has a suitably closed lateral inlet 74' for entrance of the grain and is connected above the same with a box or chamber 76 from which leads a vent pipe 77 to the outer atmosphere. A valve 74a is provided in the head of chute 74 to cut off communication between the same and said lateral inlet 74' when the latter is in use. From the box or chamber 76 also leads a conductor 78 connecting the same with an air supply pipe 79, to which the conductors from all the bins B and B' of any certain number of bins may be connected, and which pipe 79 leads from an air conditioner 80. The box or chamber 76 contains a valve 81 which is movable to open and close communication between the conductor 78 and the spout and is also movable to open and close communication between the spout and the vent pipe 77. In practice the valve may be coupled to the grain inlet door of the spout head so that when the door is open the spout head is vented to the atmosphere. The air conditioner 80 may be one of a type in common use for air conditioning railway passenger cars and such as shown in patents or patent applications of my own for apparatus for air conditioning railway cars, such conditioner having a suction and discharge fan for drawing air thereinto through an inlet 80', together with suitable means, automatically governed by a hygrostat for humidity and a thermostat for temperature, for conditioning the air prior to its discharge through the pipe 79 as to temperature and humidity.

The method of operation in employing the two-pipe system is as follows:

As stated, the method employed by me is one whereby grain in storage may be properly aerated without withdrawal from the storage bins for cooling and airing, thereby saving the losses and expenses of removal from the bins and thus increasing the capacity of a given plant by eliminating the necessity for extra storage bins needed where the grain has to be frequently turned. This method is patterned as closely as possible from nature's own method of grain preservation, and the method is adaptable for the storage of grain which has been treated electrically or chemically for elimination of parasites as well as untreated grain.

In practice, grain storage plants are usually provided with electrical indicating systems, including thermocouples or the like, arranged at different elevations and points within the individual grain bins, whereby when a "hot spot" forms, or the temperature unduly rises at any point, zone or portion of the grain in a bin, an indication of the hot spot and its point of location will be given. These hot spots may develop with great rapidity and favor the rapid propagation and distribution of insects unless eliminated, and the only method of eliminating them heretofore has been by the expensive practice of removing and running all of the grain from the bin. Similarly, where sweating of the grain, and liability of the same becoming moldy and irreparably damaged, occurs, the only way of removing the moisture and preventing increasing damage to the grain was by the same method of treatment, namely, removal of all the grain from the bin and the running thereof.

In removing hot spots or reducing the temperature of the grain in accordance with my method, the grain may be treated for the removal of one or a number of hot spots, by forcing compressed air into the grain through the properly located air distributing and suction heads. This air will be discharged or jetted with force from the nozzles and will expand as it issues into the grain. Compressed air so expanded from a higher to a lower pressure will absorb heat units. Consequently it will dissipate the hot spot in the grain. Its discharge in the grain at this congested point will also stir up and loosen the grain in the zone of discharge of the streams of air and thus release the stale hot air trapped within the interstices of the grain in this zone. The excess air discharged into the grain in this manner may be allowed to escape through the open vent pipe 77, whereby the stale air will be carried off with entrained impurities, thus avoiding any appreciable accumulation of pressure above atmospheric pressure.

It will, of course, be understood that it is desirable under certain conditions to introduce compressed air which is at an accurately predetermined temperature below ambient temperature. During the winter this can easily be done by passing air from the compressor through the atmospheric aftercooler 49. During the summer the same result can be gained by passing the compressed air through the air cooler and drier 55, in which it will pass over refrigerant expansion coils, whereby it will be cooled and dried or deprived by condensation of a large part of its moisture by contact with the coils. Thus during winter and summer cool compressed air of 50° F. or lower may be supplied. Generally speaking, it is desirable to keep the grain as cool as economically consistent, because by so doing the development of insects and microorganisms is mitigated, and in the case of insect eggs or larvae their development to an adult stage is prevented if the temperature is maintained at about 50° F. or less. After elimination of a hot spot at any point or where existing at a plurality of points throughout the grain, the system may be employed for gently and slowly, or with any degree of rapidity desired, withdraw the stale musty air by suction from the hot spot. This will be accomplished by disconnecting the proper air distributor and suction head from the compressed air supply pipe 62 and connecting the same with the suction pipe 67, by means of which the stale air and impurities will be exhausted. Grain under pressure, as in a bin, will not flow upward, but under the influence of vacuum of a certain degree, the lighter particles of chaff, etc., will be floated on the column of air moving under the influence of the vacuum. These particles will be carried off from the bin but arrested and removed in the dust collector 66. Should any clogging at any time occur in any of the distributor and suction heads the application of compressed air will immediately relieve such clogged condition.

After dissipation of the hot spot and the evacuation of the stale air in that zone, which may be accomplished in the manner described with great rapidity and at low cost, fresh air may be injected to take the place of the withdrawn stale air, after which the valve pipe may be turned to open communication between the bottom distributor and suction head and the vacuum system, and to close communication between the valve pipe and the other distributor and suction heads, whereby a moderate vacuum pull may be instituted within the bottom head 37, whereby any stale air and carbon dioxide or other gases which may have settled to the bottom of the bin may be gradually removed under the influence of the vacuum. For each cubic foot of air and/or carbon dioxide removed, an equal amount of air conditioned as to humidity, also temperature if required, will be supplied from the air conditioner 80 and introduced through the spout 74 at the top of the bin. In this action outside air will be taken in at 80' and passed through the air conditioner 80, the operation of which is governed by a hygrostat for humidity and a thermostat for temperature control, and the conditioned air will be delivered through conduit 79, pipe 78, box 76 and spout 74, to the bin, the valve 81 in this operation being closed to cut off communication between the vent pipe 77 and the spout. In this manner foul air and gases settling at the bottom of the bin may be removed and its place taken by fresh conditioned air supplied at the top of the bin, so that the atmosphere of the bin may be changed within any given period of time following elimination of hot spots and other objectionable conditions, so that a wholesome atmosphere may be established and maintained in the bin. At any time when it may be deemed desirable chemical cooling agents, such as carbon dioxide or fumigants or insecticides may be introduced and distributed in a most effective manner throughout the grain for the treatment thereof. It will be evident that by providing the air conditioning unit air conditioned as regards both temperature and humidity may be supplied to the bin without regard to the association of the air or external atmospheric conditions.

It is well known by all familiar with the storage of grain, especially when it is stored during warm weather, that the grain is liable to sweat at a later period when the temperature of the outside air becomes low. If this condition is allowed to remain, the grain is liable to mold and to otherwise become damaged or spoiled. By means of my method of treatment this objectionable condition of the grain may be wholly overcome, for the reason that as the air is evacuated from the bins partly or fully filled with grain the moisture in the grain will under the influence of the lower pressure evaporate, and the excess moisture will be carried off with the evacuated air.

The air conditioner 80 may be of a type which is chilled by a water spray, and the water supplied for this spray may, if desired, be supplied by a water pipe connection with the air drier and cooler 55, which is provided with refrigerant expansion coils.

The method of treatment and the operation of the two-pipe system above described may be carried out in exactly the same way by the use of the multiple-pipe system, except that in the case of the multiple-pipe system, the valves controlling the air feed pipes will be manipulated to secure the desired results, instead of a control action effected by adjustment of the valve pipe of the two-pipe system, as will be readily understood.

The arrangement of the air distributor and suction heads and the stand pipe in the multiple-pipe system employed in each bin B' is substantially the same as that disclosed with reference to the two-pipe system employed in each bin B, but in place of the valve pipe 2 a series of air feed and suction pipes 2a—2i, inclusive, equal in number to the distributor and suction heads are employed, the central pipe 2a of the series extending to and communicating with the bottom head 37 and each pipe communicating at its lower end through a passage 11'' with a channel 11a from which radiate ports or passages 13a connected with the conductor pipes 15'. Each of these pipes 2a—2i extends at its upper end above the bin B' and is coupled by a U-connection 82, in the arms of which are cut-out and control valves 83 and 84, with pipes 85 and 86 connecting with the air feed and suction pipes 62 and 67, respectively, in which pipes 85 and 86 are cut-out and control valves 85' and 86'. A valved connection 87 is provided between the pipe 85 and 83 whereby a carbon dioxide or other suitable chemical cooling agents, fumigants or insecticides may be introduced for injection with the air into the grain for cooling or chemically treating the grain to purify the contained air or destroy insect life or to sterilize the bin prior to the storage of the grain. For simplicity of illustration I have shown the above-described elements 82—87 in connection with only one of the air feed and supply pipes, but it is to be understood that each air feed and suction pipe will be provided with valve pipe connections of the type described and coupled to the air supply and suction pipes 62 and 67 and the air conditioner, so that the pipes 2a, etc., may be independently or simultaneously employed for injecting air into or withdrawing air from the bin at any certain level or two or more different levels simultaneously.

From the foregoing description, taken in connection with the drawings, my method of and apparatus for treating grain in storage for the purposes described will be readily understood by those versed in the art without a further and extended description, and it will be seen that grain stored in elevator bins or other storage receptacles may be economically treated and maintained in better condition than heretofore without the losses and expenses attendant upon the use of prior methods. Also it will be seen that my invention provides a simple, reliable and effective means for carrying the method into practical effect. While the use of the steps of the method as set forth and structural means employed is preferred, it is to be understood that variations in such steps and their sequence and changes in the form, construction and arrangement of parts of the apparatus may be made as desired and found most desirable within the scope of the appended claims, without departing from the spirit or sacrificing any of the advantages of the invention.

What I claim is:—

1. The method of aerating stored grain, which consists in injecting and expanding air under pressure into the local hot spots in the grain so as to stir up the grain and the air therein directly in the hot spot regions under the air pressure and to cool the grain by reduction of temperature due to air expansion.

2. The method of aerating stored grain, which consists in injecting and expanding air under pressure into hot spot points in the grain so as to stir up the grain and the air at such points under the air pressure and to effect the localized cooling of the grain at such point by reduction of temperature due to air expansion, then withdrawing the temperature modified mixed air, and then introducing cool fresh air to take its place.

3. The method of aerating stored grain, which consists in injecting and expanding air under pressure into hot spot points in the grain so as to stir up the grain and the air at such points under the air pressure and to cool the grain by reduction of temperature due to air expansion, withdrawing by suction from the treated hot spot points the temperature modified mixed air and introducing cool fresh air to take the place of the withdrawn air.

4. The method of removing hot spots from grain, which consists in jetting and expanding streams of compressed air into the hot spot points of the grain, so as to stir and loosen up the grain and effect the localized cooling of the same and the contained stale air by expansion of the air jets, withdrawing the mixed air by suction, and introducing fresh conditioned air to take its place.

5. The method of treating grain in storage in a bin or other receptacle for eliminating hot spots or excessive moisture therein, which consists in injecting streams of air directly into the grain at the hot spot point under pressure sufficient to effect a localized separation and loosening up of the grain at such point and to free the stale heated air and moisture therefrom and cool the grain by expansion of the compressed air streams, withdrawing the mixed air and liberated impurities from the hot spot points, and introducing fresh air to take the place thereof.

6. The method of eliminating hot spots in a stored mass of grain, which consists in compressing air at or below ambient temperature to a degree to adapt the air to be reduced to a pronounced lower degree of temperature upon its expansion, conducting the compressed air to the hot spot point in the mass of grain, injecting the compressed air under its pressure force directly into the grain at the hot spot point so as to effect by such force a localized loosening up of the grain and turning over of the individual grain particles at such point for intimate exposure to the air and the freeing of chaff and other loose impurities and surface insect life and so as to effect by its reduction of temperature due to its expansion the localized cooling of the grain at the hot spot point to a degree below that favoring growth of insect life, withdrawing by suction from the treated point the loosened foreign substances and impurities and the mingled original stale air and treatment air and discharging the same from the body of grain, and then introducing into the grain at the treated point pure air at ambient or lower temperature to take the place of the withdrawn air.

7. The method of eliminating hot spots in a stored mass of grain, which consists in compressing air at or below ambient temperature to a degree to adapt the air to be reduced to a pronounced lower degree of temperature upon its expansion, conducting the compressed air to the hot spot point at a certain level in the mass of grain, injecting the compressed air under its pressure force directly into the grain at the hot spot point so as to effect by such pressure force a localized loosening up of the grain and turning over of the individual grain particles at said point for intimate exposure to the air and the freeing of chaff and other loose impurities and surface insect life and so as to effect by its reduction of temperature due to its expansion the localized cooling of the grain to a degree below that favoring insect propagation, withdrawing by suction from the treated point the loosened foreign substances and impurities and the mingled original stale air and treatment air and discharging the same from the body of grain, and then introducing into the treated zone pure air at ambient or lower temperature to take the place of the exhausted air, repeating the operations above described for the elimination of hot spots at different points and at different levels in the grain mass, and then withdrawing from the bottom of the mass the carbon dioxide or other settled gases and injecting pure air to take the place thereof.

8. The method of eliminating hot spots in a stored mass of grain, which consists in compressing air at or below ambient temperature to a degree to adapt the air to be reduced to a pronounced lower degree of temperature upon expansion, conducting the compressed air to the hot spot point in the mass of grain, injecting the compressed air under its pressure force directly into the grain at the hot spot point so as to effect by such force a localized loosening up of the grain and turning over of the individual grain particles at said point for intimate exposure to the air and the freeing of chaff and other loose impurities and surface insect life and so as to effect by its reduction of temperature due to its expansion evaporation of excess moisture and the cooling of the grain at the treated point to a degree below that favoring growth of insect life, withdrawing by suction from the treated point the loosened foreign substances and impurities and the mingled stale air, extracted moisture and treatment air and discharging the same from the body of grain, and then introducing into the grain at the treated point pure dehydrated air at ambient or lower temperature to take the place of the exhausted air.

9. The method of eliminating hot spots and excessive moisture in a mass of stored grain, which consists in compressing air at or below ambient temperature to a degree to adapt the air to be reduced to a pronounced lower degree of temperature upon its expansion, conducting the compressed air to a hot spot point at a certain level in the mass of grain, injecting the compressed air under its pressure force directly into the grain at the hot spot point so as to effect by such force a localized loosening up of the grain and turning over of the grain particles at such point for intimate exposure to the air, and the freeing of chaff and other loose impurities and surface insect life, and so as to effect by its reduction of temperature due to its expansion the evaporation of excess moisture and cooling of the grain at the treated point to a degree below that favoring growth of insect life, withdrawing by suction from the treated point the loosened impurities and the mingled stale air and treatment air and discharging the same from the body of grain, then introducing into the grain at the treated point pure air at ambient or lower temperature to take the place of the exhausted air, then successively repeating such steps for the elimination of hot spots and excessive moisture at different points at different levels in the grain where required until the entire mass of grain is treated, and venting from the top of the storage receptacle during such actions any excess pressure of air seeping upward through the grain.

10. The method of treating grain in a storage receptacle for the elimination of hot spots and removing excessive moisture, stale air and gases, which consists in successively and independently injecting fresh cool air under pressure into the local hot spots in the grain at different levels and allowing the air charge to expand and cool the grain and loosen up impurities directly in the hot spot regions, withdrawing by suction from each level treated the warm air, moisture and loosened impurities, venting to the atmosphere at the top of the receptacle the residual warm air, moisture and impurities arising thereto, and then withdrawing by suction directly from the bottom of the receptacle gases of heavy gravity which have accumulated therein.

JESSE H. DAVIS.